United States Patent Office 3,426,775
Patented Feb. 11, 1969

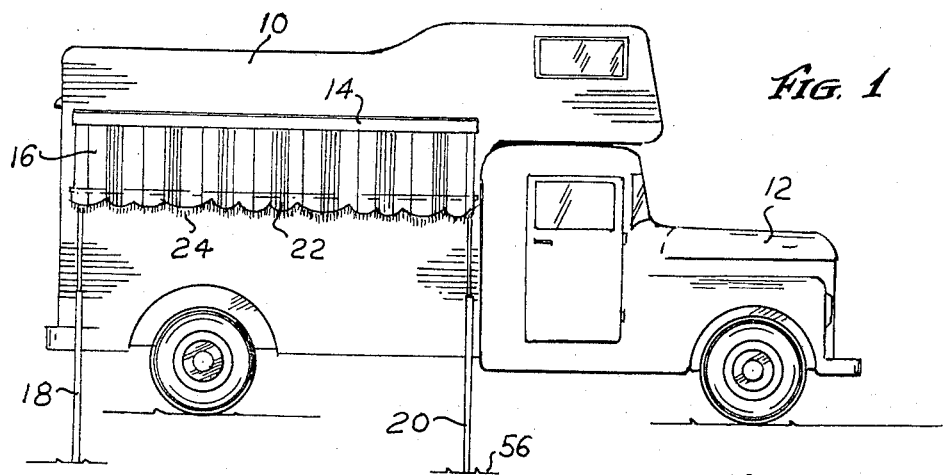
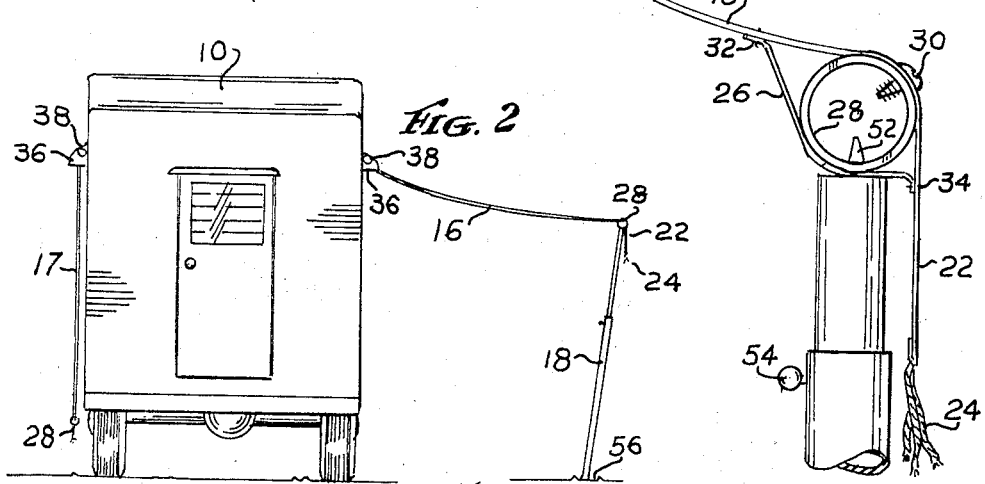
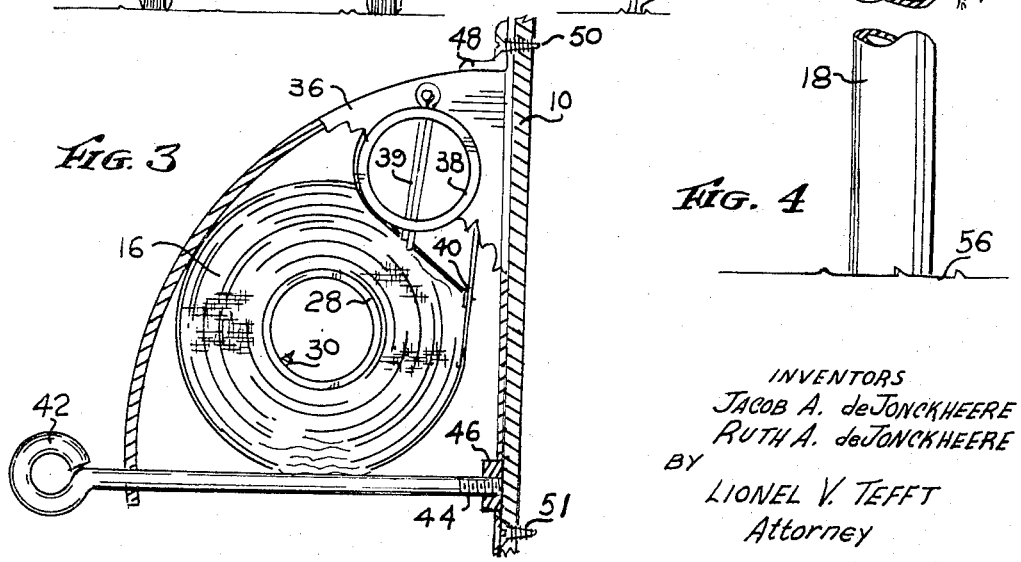

---

3,426,775
CAMPER TRUCK MOUNTED AWNING
Jacob A. de Jonckheere and Ruth A. de Jonckheere, both of 3815 Melody Lane, Riverside, Calif. 92504
Filed Nov. 25, 1966, Ser. No. 596,901
U.S. Cl. 135—5
Int. Cl. E04f 10/04
2 Claims This invention relates to awnings and specifically to camper truck mounted awnings.

One of the main objects of this invention is to provide a means of attaching a compact weather protected self contained retractable awning to a truck mounted camper or trailer mounted camper.

Another object of the invention is to provide a quick and easy means of erecting a camper or trailer mounted awning.

Still another object of the invention is to provide a means for shading a side of the camper or trailer from direct rays of the sun.

A further object of the invention is to provide a means of quickly removing the awning for storage or use away from the camper.

Yet another object of the invention is to provide an ornamental functional awning which can be quickly erected for use or quickly retracted and secured for traveling.

Other objects and advantages of present invention will become apparent to those skilled in the art upon consideration of the following detailed description of the preferred embodiment thereof, reference being had to the accompanying drawings, wherein:

FIGURE 1 is a plan view of the device mounted on a camper truck.

FIGURE 2 is an end view of the camper truck with the awning on each side in different use positions.

FIGURE 3 is a sectional view of the awning assembly in retracted position.

FIGURE 4 is a sectional view of the pole and tube assembly supporting outer edge of the awning.

Referring to the drawing a camper 10 is shown truck mounted on a truck 12. Attached to the camper 10 is an awning container 14 secured to the camper by means of screws 50 on the upper edge the awning container 14 and screws 51 along the lower edge at the awning container. The awning 16 in erected position is supported on the outer end by adjustable poles 18 and 20. On the outer end of the awning 16 is a hanging ornamental scalloped section 22 adorned by a fringe 24. In use the awning is supported between two metal tubes 28 on the pole end and 38 on the camper end. Tube 38 is secured in end plates 36 on awning container 14. Tube 38 passes through a loop sewn in the awning 16 by a stitched seam 40. Tube 38 is removably supported in holes in end plates 36 and retained by pins 39 through tube 38 where it extends through end plates 36. In its retracted position the awning is manually rolled around tube 28 to which is attached screws 30 along its length. A loop in the awning is formed a section of awning material 26 stitched at 32 and 34 through which tube 28 is passed to support outer edge of the awning. When the awning is manually rolled into retracted position it is retained in the container 14 by eyebolts 42 screwed into nuts 46 by threads 44. Normally eyebolts are spaced the length of the rolled awning and at least three are required. An angle shaped re-inforcing strip 48 is attached to the awning container at the top through which screws 50 and 51 spaced the length of container 14 secure it to the outer wall of the camper 10. The collapsible and adjustable poles 18 and 20 are provided with a point 52 which goes through in tube 28 and are adjustable for height by thumbscrew 54 after they have been inserted into the ground at 56.

In describing the use of above invention it may be readily seen that erecting the awning for use is simply a matter of removing the eyebolts and letting it drop for the purpose of shielding the camper side from direct sunlight, or adding the poles for providing a source of shade next to the camper.

While we have shown and described in considerable detail what we believe to be the preferred form of our invention it will be understood by those skilled in the art that various changes may be made in the shape and arrangement of the various parts without departing from the broad scope of the invention as defined in the following claims.

We claim:
1. A camper having an awning comprising:
   a horizontally disposed protective housing secured along at least one side, of the camper, and being open at the bottom thereof;
   said housing having end plates provided with opposed apertures;
   a first awning attaching rod detachably secured in said end plate apertures;
   a second manually expansible and retractible awning attaching rod disposable under said housing;
   an awning attached at its camper end to the first rod and at its outer end to the second rod and rollable thereabout; and
   plural detachable awning and rod securing members supported in the outer edge of the housing and against the slide of the camper whereby the awning may be manually withdrawn from the housing to an extended position upon removal of said securing members; and retained by said securing means in the housed position during travel.

2. A device as set forth in claim 1 in which spaced awning supporting poles have their upper ends arranged to engage cooperating portions on the second rod to secure the awning in the extended position.

References Cited

UNITED STATES PATENTS

| | | | |
|---|---|---|---|
| 1,483,741 | 2/1924 | Moffet | 135—5 |
| 2,568,048 | 9/1951 | Arnold | 135—5 |
| 3,327,724 | 6/1967 | Nielson | 135—5 |

KENNETH DOWNEY, *Primary Examiner.*